United States Patent [19]

Mueller

[11] Patent Number: 5,296,291
[45] Date of Patent: Mar. 22, 1994

[54] HEAT RESISTANT BREATHABLE FILMS

[75] Inventor: Walter B. Mueller, Inman, S.C.

[73] Assignee: W. R. Grace & Co.-Conn., Duncan, S.C.

[21] Appl. No.: 347,858

[22] Filed: May 5, 1989

[51] Int. Cl.$^5$ .................. B32B 3/10; B32B 31/14; B32B 27/08
[52] U.S. Cl. .................. 428/349; 428/476.3; 428/476.9; 428/483; 428/516; 428/520; 428/910; 428/137; 428/35.2; 264/176.1; 426/127; 156/252; 156/87
[58] Field of Search .............. 428/349, 483, 910, 516, 428/520, 476.3, 476.9, 137

[56] References Cited

U.S. PATENT DOCUMENTS 4,657,610 4/1987 Komatsu et al. .................. 156/87
4,935,271 6/1990 Schirmer .................. 428/352

Primary Examiner—P. C. Sluby
Attorney, Agent, or Firm—John J. Toney; William D. Lee, Jr.; Leigh P. Gregory

[57] ABSTRACT

A multilayer laminate comprises a first perforated film of propylene homopolymer or copolymer, oriented heat set polyester or oriented heat set polyamide and a second film bonded to the first film and including a bonding layer of ethylene vinyl acetate copolymer or chemically modified ethylene unsaturated ester copolymer, a core layer of a heat resistant, breathable polymeric material, and an outer heat sealable layer. One or more filler layers may be included in the structure, located between the outer heat sealable layer and a polymeric adhesive layer.

15 Claims, 2 Drawing Sheets

HEAT RESISTANT BREATHABLE FILMS

BACKGROUND OF THE INVENTION

Lettuce is currently packaged in a non-stretchable heat resistant film. The film structure includes a layer of polyester bonded to a layer of polyethylene. This film offers low moisture permeability which is desirable in packaging lettuce and similar produce. However, it is also low in gas permeability, which reduces the shelf life of chopped lettuce when oriented heat set polyester is used.

Other heat set films typically used in this application have oxygen transmission rates of less than 5000 cc/meter$^2$ at 1 atmosphere 24 hours at 73° F.

With the packaging of lettuce and similar produce, it is desirable to provide a packaging material with a high gas permeability, preferably greater than 5000 cc per square meter, yet with low moisture transmission rates in order to resist loss of moisture from the food product.

A packaging material with these properties is disclosed in U.S. Ser. No. 240,994 now U.S. Pat. No. 4,935,271, assigned to W. R. Grace & Co.-Conn. The laminate comprises a first perforated film having propylene homopolymer or copolymer, and a second film bonded to the perforated film including a bonding layer of ethylene vinyl acetate copolymer and an outer heat sealable layer.

While this film provides the high gas permeability and low moisture permeability, as well as stiffness and toughness required in the laminate for packaging produce, it is desirable to provide a film useful for packaging produce as well as other materials and having good heat resistance while maintaining the breathability of the film.

SUMMARY OF THE INVENTION

In one aspect of the invention, a multilayer laminate comprises a first perforated film, and a second film, bonded to the first film, including a bonding layer of ethylene vinyl acetate copolymer, a core layer of a heat resistant, breathable polymeric material, an outer heat sealable layer, and a polymeric adhesive layer disposed between and bonding the core layer to each of the bonding and heat sealable layers respectively.

In another aspect of the present invention, a method of making a multilayer laminate comprises coextruding a first film having an outer bonding layer of ethylene vinyl acetate copolymer, a core layer of a heat resistant, breathable material, an outer heat sealable layer, and an adhesive layer between the heat resistant layer and each of the outer layers, and bonding the first film to a perforated film.

BRIEF DESCRIPTION OF THE DRAWINGS

The invention can be further understood by reference to the drawing figures, wherein.

DESCRIPTION OF THE PREFERRED EMBODIMENTS

Figure 1:
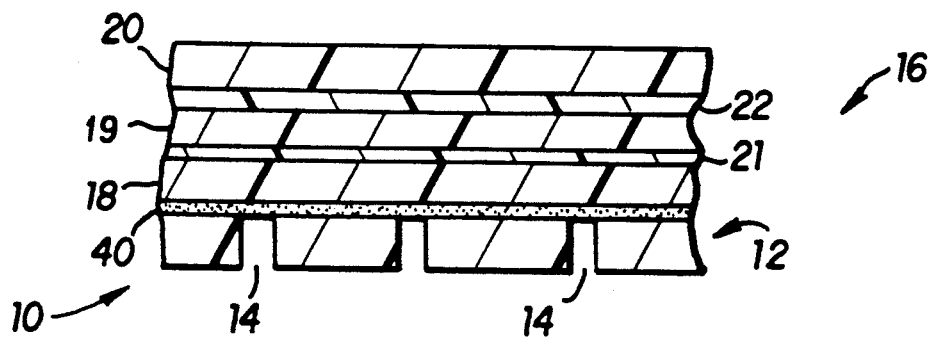
FIG. 1 is a schematic cross sectional view of the multilayer laminate of the present invention.

Referring to FIG. 1, the multilayer laminate 10 includes a perforated film 12 having perforations 14 therein. In the preferred embodiments, layer 12 comprises a propylene homopolymer (PP), although a propylene copolymer such as ethylene propylene copolymer (EPC) may be used. Various homopolymers and copolymers of polypropylene are commercially available and well known in the art. One film especially preferred for the present invention is a commercial oriented film designated PY supplied by the Cryovac Division of W. R. Grace & Co.-Conn.

Alternative materials for perforated film 12 are oriented heat set polyester and oriented heat set polyamide (nylon).

A coextruded film 16 is also depicted in FIG. 1. Film 16 includes a bonding layer 18, a core layer 19 of a heat resistant, breathable material, and an outer heat sealable layer 20.

In the preferred embodiment, bonding layer 18 is made up of a high vinyl acetate, low melting point ethylene vinyl acetate copolymer (EVA) such as Elvax 3180 available from du Pont, having a melt index of between 23 and 27 grams/10 minutes, a vinyl acetate content by weight of between 27 and 29%, and a density of between about 0.948 and 0.954 grams per cubic centimeter. Even more preferably, bonding layer 18 comprises an EVA such as the material described above blended with from 1 to 25% of an antiblocking agent. An especially preferred antiblocking agent for this blend is a blend of 90% low density polyethylene and 10% of colloidal, silica.

Core layer 19 comprises a heat resistant, breathable material.

By "heat resistant" is meant that layer 19, when incorporated in the multilayer laminate of this invention, provides additional resistance to the heat imparted by heat sealing this material when used to make a pouch, bag, or other type of enclosed container. This heat resistant material therefore helps to maintain the structural integrity of the package, particularly in the seal area of the final pouch, bag or other container.

The term "breathable" is used herein to mean a degree of oxygen transmission which permits for example produce packed within a bag or pouch made from this material to respire, i.e. transmit gases to the outside environment. The material of core layer 19 should therefore have an oxygen transmissibility or permeability of greater than 4000 cc per square meter (ASTM D 3985) (1 mil). Suitable materials for core layer 19 include copolyesters such as PCCE 9965 or PCCE 9967 available from Eastman; polymethyl pentene, and polyether block amide copolymers such as those available under, the trade designation Pebax.

The overall oxygen permeability of laminates made in accordance with the present invention is preferably greater than about 5000 cc per square meter 3985) (1 mil). The material of core layer 19 is preferably a very thin layer so as not to adversely affect the breathability of the overall laminate 10, 30, 50, or 70. If the thickness of core layer 19 is increased, it is preferable that materials with higher oxygen transmissions are chosen for layer 19.

Outer heat sealable layer 20 can be the same material as in layer 18, or another ethylene vinyl acetate copolymer such as Exxon 32.89, an EVA with a vinyl acetate content of about 4.5%. Layer 20 can also be a low density polyethylene (LDPE) or ionomer. An especially preferred material for heat sealable layer 20 is linear low density polyethylene. An example of such a material suitable for layer 20 is the resin available from Dow under the designation Dowlex 2050A.

Lower vinyl acetate content EVA resins, such as the Exxon 32.89 material just described, may also be used as the material of the bonding layer 18 of second film 16. However, when used in connection with the preferred corona treatment process for bonding the second film 16 to first film 12, lower vinyl acetate EVA resins will not perform as well as higher vinyl acetate resins such as the du Pont material described above. High vinyl acetate content combined with relatively low melting points characterize the optimal EVA resins for bonding layer 18.

Intermediate adhesive layers 21 and 22 are disposed between and bond the heat resistant, breathable layer 19 to the bonding layer 18 and outer heat sealable layer 20 respectively.

Various polymeric adhesives will be found to be useful in this role, and especially chemically modified ethylene methyl acrylate copolymer (e.g. Plexar 3382 available from Quantum) and chemically modified ethylene vinyl acetate copolymer (e.g. Bynel E361 or Bynel 3062 available from du Pont).

Figure 2:
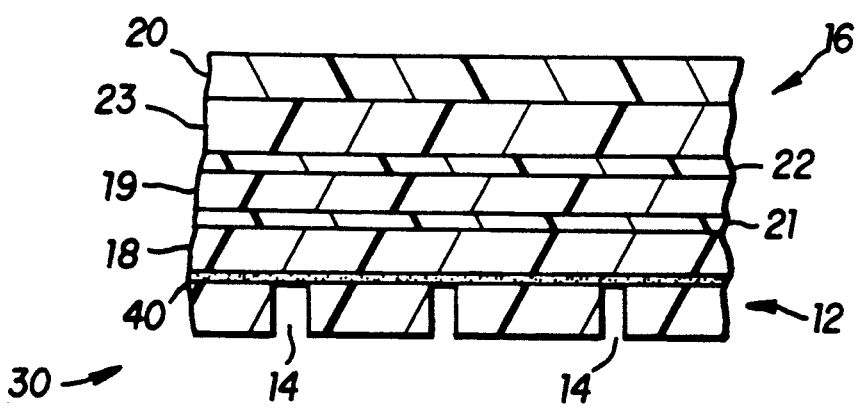
FIG. 2 is a schematic cross sectional view of an alternative embodiment of a multilayer laminate in accordance with the present invention.

Referring to FIG. 2, a multilayer laminate 30 like that of FIG. 1 is shown, but in which a filler layer 23 is disposed between the adhesive layer 22 and outer heat sealable layer 20 of second film 16. The preferred resin for filler layer 22 is a very low density polyethylene (VLDPE) such as DEFD 1138 available from Dow and having a density of about 0.912 grams/cc. Another preferred resin for filler layer 23 is EVA, such as PE 3508 available from du Pont.

Although FIG. 2 depicts filler layer 23 as a single layer, in fact more than one filler layer may be used in the laminate of the present invention. For example, two or three filler layers may be used. The choice of material and the number of filler layers, as well as their thicknesses, may be made according to the need for providing strength and other characteristics to the laminate. These needs will vary with the nature of the produce or other product to be packaged, the type of heat seal equipment used to form the laminate into a container, and the choice of materials in the other layers of the laminate. When more than one filler layer is used, they are preferably coextrued so that they are adjacent to each other in the structure of film 16, and preferably positioned between outer heat sealable layer 20 and core layer 19.

Figure 3:
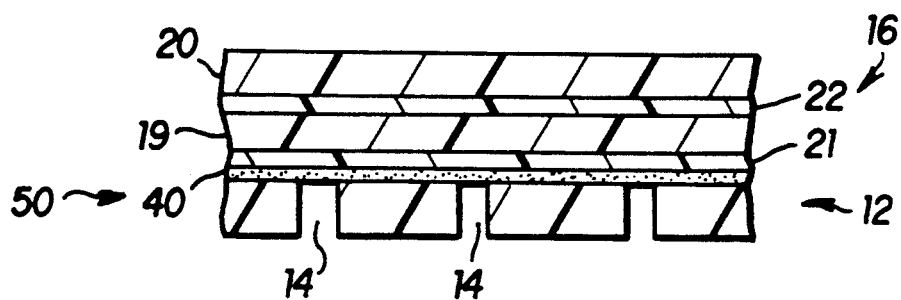
FIG. 3 is a schematic cross section of still another embodiment of the multilayer laminate of the present invention.

In still another embodiment of the present invention, depicted in FIG. 3, a laminate structure like that of FIG. 1 is shown in which the bonding layer 18 of EVA is absent from the structure. In this embodiment, the polymeric adhesive layer 21 is relied on as the bonding layer for adhesion to the perforated film 12.

This provides for a more simplified structure, but also increases the possibility of film blocking during the production of film 16.

Layers 21 and 22 of each of the embodiments are preferably made up of the same polymeric adhesive. However, different polymeric adhesives such as those listed earlier may be used for each of these adhesive layers.

Figure 4:
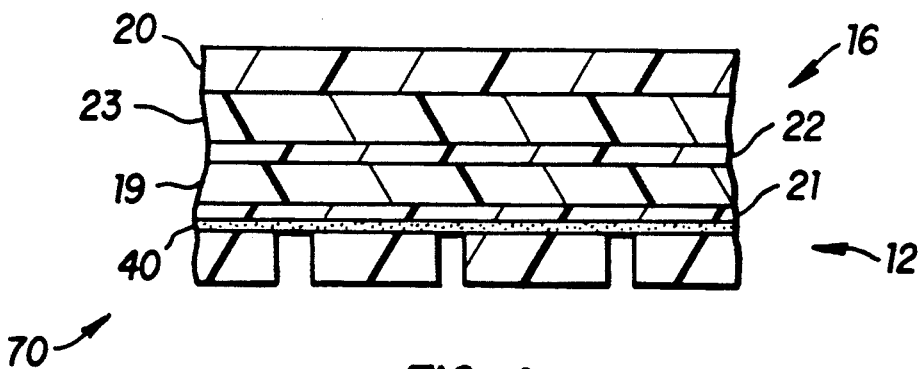
FIG. 4 is a schematic cross section of yet another embodiment of the multilayer laminate of the present invention.

Modification of the laminate of FIG. 3 is shown in FIG. 4. FIG. 4 illustrates an embodiment like FIG. 2, utilizing filler layer 23, and is also like FIG. 3 in that polymeric adhesive layer 21 functions as the bonding layer for bonding the coextruded film 16 to perforated film 12.

The perforated film 12 may be made by extruding e.g. a polypropylene or ethylene propylene copolymer film, and perforating same by means well known in the art such as flame or needle perforation.

The second multilayer film 16 can be made by standard coextrusion techniques.

Alternatively, the second multilayer film 16 can be made by lamination techniques, or a combination of coextrusion and lamination. In the case of lamination, one or both of the polymeric adhesive layers 21 and 22 may become unnecessary.

Multilayer second film 16 is bonded to perforated film 12 preferably by corona treating the bonding layer surface of bonding layer 18, the facing surface of film 12 (i.e. the surface to be adhered to the second film 16), or both surfaces, and then, preferably under some heat and pressure, adhering the second film 16 to the perforated film 12. This bond is designated at 40 in the drawings. In the case of the embodiment shown in FIGS. 3 and 4, the facing surface of adhesive layer 21, the facing surface of perforated film 12, or both surfaces are corona treated.

Other bonding techniques, including the use of conventional lamination adhesives, may also be used. However, bonding techniques in which a separate adhesive is utilized may be less desirable where certain end uses, such as lettuce packaging, are combined with certain types of machinery for creating a finished package.

In the preferred embodiment, packaging film of the present invention is especially suitable for use in connection with Kartridg-Pak or other types of vertical form fill seal machinery.

The invention may be further understood by reference to Table 1 indicating a specific laminate structures made in accordance with the present invention.

TABLE 1

| EXAMPLE | |
|---|---|
| 1 | PP//EVA/TIE/COPOLYESTER/TIE/VLDPE/ EVA/VLDPE/LLDPE |

In the film of Example 1, about 20% of the bonding layer 18 comprised an antiblocking agent which had been preblended with the EVA prior to extrusion. The antiblocking agent used included 90% low density polyethylene blended with 10% of a colloidal silica master batch.

The term "tie" is used to refer to the polymeric adhesive layers of the laminate.

Although the present invention has been described by reference to the specific embodiments and examples, those skilled in the art would readily understand that modifications may be made by one skilled in the art after a review of this description without departing from the spirit and scope of the claims which follow.

What is claimed is:

1. A multilayer laminate useful in packaging produce comprising:
   (a) a first perforated film; and
   (b) a second film, bonded to the first film, comprising i) a bonding layer of ethylene vinyl acetate copolymer;
ii) a core layer of a heat resistant, breathable polymeric material selected from the group consisting of copolyesters, polymethyl pentene, and polyether block amide copolymer;
iii) an outer heat sealable layer; and
iv) a polymeric adhesive layer disposed between and bonding the core layer to each of the bonding and heat sealable layers respectively.

2. The multilayer laminate of claim 1 wherein the perforated film is a polymeric material selected from the group consisting of oriented polypropylene, oriented ethylene propylene copolymer, oriented heat set polyester, and oriented heat set polyamide.

3. The multilayer laminate of claim 1 wherein the bonding layer of ethylene vinyl acetate copolymer comprises a high vinyl acetate, low melting point ethylene vinyl acetate copolymer.

4. The multilayer laminate of claim 3 wherein the ethylene vinyl acetate copolymer has a vinyl acetate content, by weight of the resin, of between about 4.5% and 28%.

5. The multilayer laminate of claim 1 wherein the polymeric adhesive is selected from the group consisting of chemically modified ethylene methyl acrylate copolymer and chemically modified ethylene vinyl acetate copolymer.

6. The multilayer laminate of claim 1 wherein the heat sealable layer comprises a polymeric material selected from the group consisting of linear low density polyethylene, low density polyethylene, ionomer, and ethylene vinyl acetate copolymer.

7. The multilayer laminate of claim 1 further comprising at least one additional filler layer disposed between the outer heat sealable layer and the polymeric adhesive layer closest to the outer heat sealable layer.

8. The multilayer laminate of claim 7 wherein the additional filler layer comprises a polymeric material selected from the group consisting of ethylene vinyl acetate copolymer and very low density polyethylene.

9. The multilayer laminate of claim 1 further comprising two additional filler layers disposed adjacent each other and between the outer heat sealable layer and the polymeric adhesive layer closest to the heat sealable layer.

10. The multilayer laminate of claim 9 wherein the two additional filler layers comprise a polymeric material selected from the group consisting of ethylene vinyl acetate copolymer and very low density polyethylene.

11. The multilayer laminate of claim 1 wherein three additional filler layers are disposed adjacent each other and between the outer heat sealable layer and the polymeric adhesive layer closest to the heat sealable layer.

12. The multilayer laminate of claim 11 wherein the filler layers each comprise a polymeric material selected from the group consisting of ethylene vinyl acetate copolymer and very low density polyethylene.

13. A multilayer laminate useful in packaging produce comprising:
(a) a first perforated film;
(b) a second film, bonded to the first film, comprising
i) a bonding layer of a chemically modified unsaturated ester copolymer;
ii) a core layer of a heat resistant, breathable polymeric material selected from the group consisting of copolyesters, polymethyl pentene, and polyether block amide copolymer;
iii) an outer heat sealable layer; and
iv) a polymeric adhesive layer disposed between and bonding the core layer to the heat sealable layer.

14. The multilayer laminate of claim 13 wherein the bonding layer is a polymeric material selected from the group consisting of chemically modified ethylene methyl acrylate copolymer and chemically modified ethylene vinyl acetate copolymer.

15. The multilayer laminate of claim 13 further comprising at least one additional filler layer disposed between the outer heat sealable layer and the polymeric adhesive layer.

* * * * *